UNITED STATES PATENT OFFICE.

HUGH BURGESS, OF ARDMORE, PENNSYLVANIA.

MANUFACTURE OF GLASS, CEMENT, &c.

SPECIFICATION forming part of Letters Patent No. 339,524, dated April 6, 1886.

Application filed December 24, 1885. Serial No. 186,642. (No specimens.)

*To all whom it may concern:*

Be it known that I, HUGH BURGESS, a subject of the Queen of Great Britain and Ireland, residing in Ardmore, Montgomery county, Pennsylvania, have invented certain Improvements in the Manufacture of Glass, Cement, Ceramic Ware, &c., of which the following is a specification.

My invention consists in the preparation and utilization for glass, cement, ceramic ware, and other manufactures of refuse carbonate of lime resulting from the boiling of soluble carbonated alkalies—such as carbonate of soda or potash—with caustic lime for the purpose of rendering the soluble alkalies caustic.

In the operation of separating the component parts of vegetable substances large quantities of refuse carbonate of lime result from this treatment with caustic lime of the carbonated alkalies, which are to be used in the separating process, and, so far as I am aware, this refuse carbonate of lime has not been utilized. By my present invention I am enabled to utilize this refuse carbonate of lime in the manufacture of glass, cement, ceramic ware, and similar materials in which it is very necessary that the carbonated or caustic lime (one of the chief constituents of glass, cement, ceramic ware, &c.,) should be in a very finely-divided condition.

The carbonate of lime resulting from the action of caustic lime on the soluble carbonated alkalies is in a highly-comminuted condition, since it has been chemically precipitated from a solution of caustic lime, and is therefore especially adapted for such manufactures as I have mentioned. I first take this refuse precipitated carbonate of lime and separate it from the solution of caustic alkalies by filtration or other suitable means, and I then wash it, so as to remove all soluble foreign matter. It is then dried by any suitable or convenient means. It is then carefully bolted through a fine bolting-cloth, so as to get it to the uniformly fine condition desired, and it is then ready for use, and can be put upon the market, to be employed in any desired manufacture. If it is desired to convert this waste carbonate of lime into caustic lime, this may be effected by first drying and then heating the material in a suitable furnace or otherwise to a temperature necessary to drive off the carbonic acid which is in combination with the lime. The material is thereby converted into caustic lime.

In certain cases where caustic-alkaline solutions have been used to separate parts of vegetable substances one from the other, the resulting alkaline solution may be evaporated to dryness and incinerated, and thus reconverted into carbonated alkalies mixed with vegetable charcoal, &c. This incinerated carbonated alkali may be again rendered caustic by boiling it with caustic lime and separating it by filtration from the mixture of carbonate of lime and vegetable charcoal. In preparing this mixture of waste carbonate of lime and vegetable charcoal for glass-making and other purposes, I remove the vegetable charcoal by heating the carbonate of lime and vegetable charcoal to such a temperature that, while the charcoal is consumed, the carbonic acid is not driven off from the carbonate of lime. The carbonate is by this process rendered pure and white, and thus refined is then bolted through suitable sieves and is ready for the market.

In certain cases it is not necessary to remove the vegetable charcoal from the carbonate of lime—as, for instance, in the manufacture of dark-brown glass, in which the charcoal acts as a coloring agent. When lighter tints of green or green-brown are required by the glass-maker, I add sufficient of the mixture of carbonate of lime and vegetable charcoal to the refined carbonate or caustic lime to insure the desired color.

If so desired, the mixture of carbonate of lime and vegetable charcoal may be converted into pure caustic lime by exposing the mixture to a temperature sufficiently high to consume the charcoal as well as to drive the carbonic acid off from the carbonate of lime.

I claim as my invention—

1. As an improvement in the manufacture of glass, cement, ceramic ware, &c., the mode herein described of utilizing refuse carbonate of lime or caustic lime, or a mixture thereof, for such manufacture, said mode consisting in drying the refuse lime and sifting the dried material, substantially as set forth.

2. The mode herein described of preparing lime for the manufacture of glass, cement, ceramic ware, &c., said mode consisting in precipitating the carbonate of lime and drying the precipitate, substantially as specified.

3. As a new article of manufacture and sale, finely-comminuted precipitated carbonate of lime, substantially as specified.

4. The mode herein described of utilizing the waste carbonate of lime which results from the boiling of soluble carbonated alkalies with caustic lime, said mode consisting in washing and drying the carbonate, sifting it, and applying it to the manufacture of glass, cement, ceramic ware, &c.

5. The mode herein described of utilizing the mixture of carbonate of lime and vegetable charcoal which results from the boiling of recovered carbonated alkalies with caustic lime, said mode consisting in separating the foreign matters from the mixture and drying it preparatory to its use for the manufacture of glass, cement, ceramic ware, &c., substantially as specified.

6. The mode herein described of utilizing the mixture resulting from the treament of recovered carbonated alkalies with caustic lime, said mode consisting in separating the foreign matters from the mixture, destroying the vegetable charcoal contained in it, and using the refined carbonate or caustic lime in the manufacture of glass, cement, ceramic ware, &c., all substantially as specified.

7. As an improvement in the art of making glass, ceramic ware, &c., the mode herein described of imparting color thereto, said mode consisting in employing vegetable charcoal with carbonate of lime in the manufacture, substantially as set forth.

8. As a new article of manufacture or sale, a mixture of finely-comminuted precipitated carbonate of lime and vegetable charcoal, all substantially as specified.

In testimony whereof I have signed my name to this specification in the presence of two subscribing witnesses.

HUGH BURGESS.

Witnesses:
WILLIAM F. DAVIS,
HARRY SMITH.